Oct. 7, 1924.  1,510,650
E. R. BURTNETT
INTERNAL COMBUSTION ENGINE
Filed Feb. 14, 1921  2 Sheets—Sheet 1
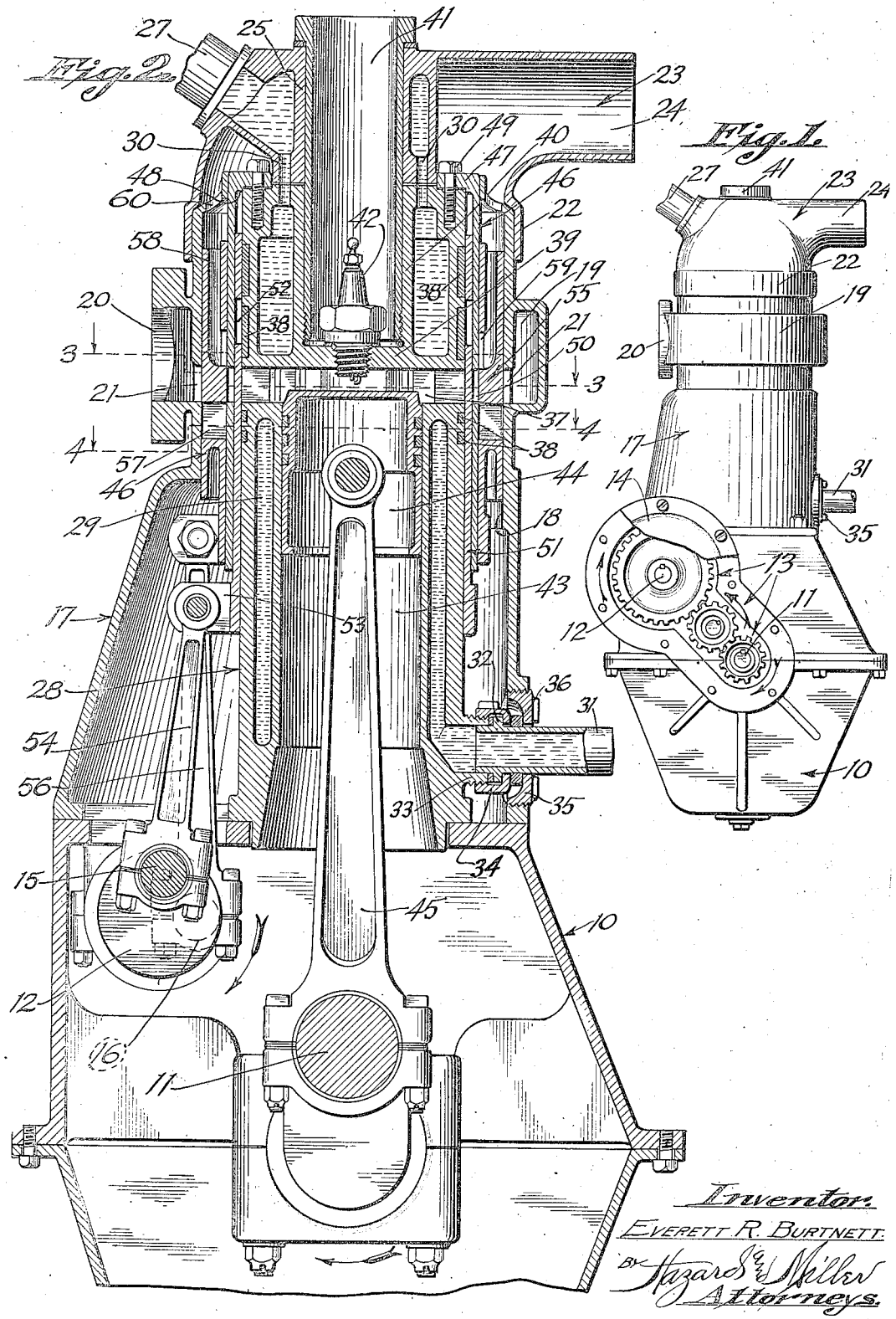
Inventor,
EVERETT R. BURTNETT.
By Hazard & Miller
Attorneys.

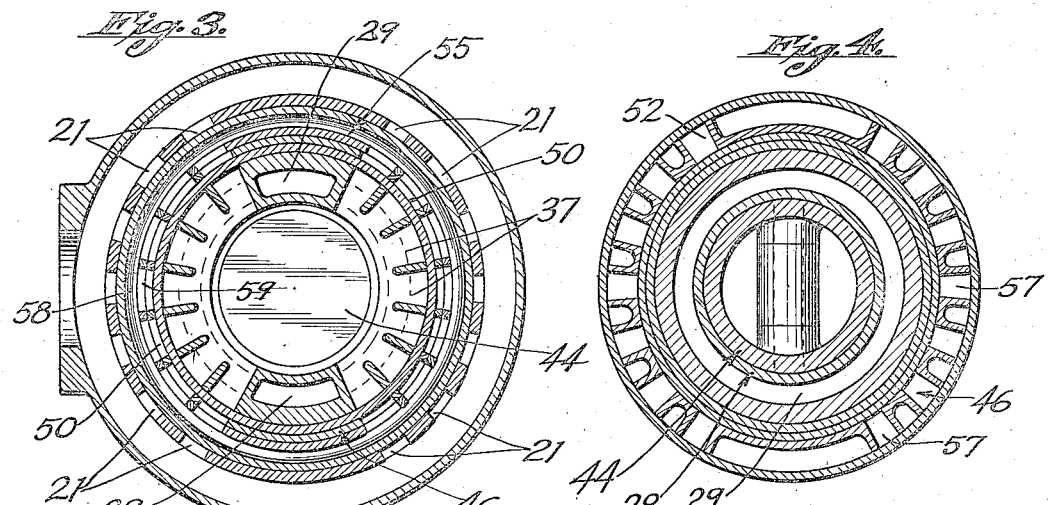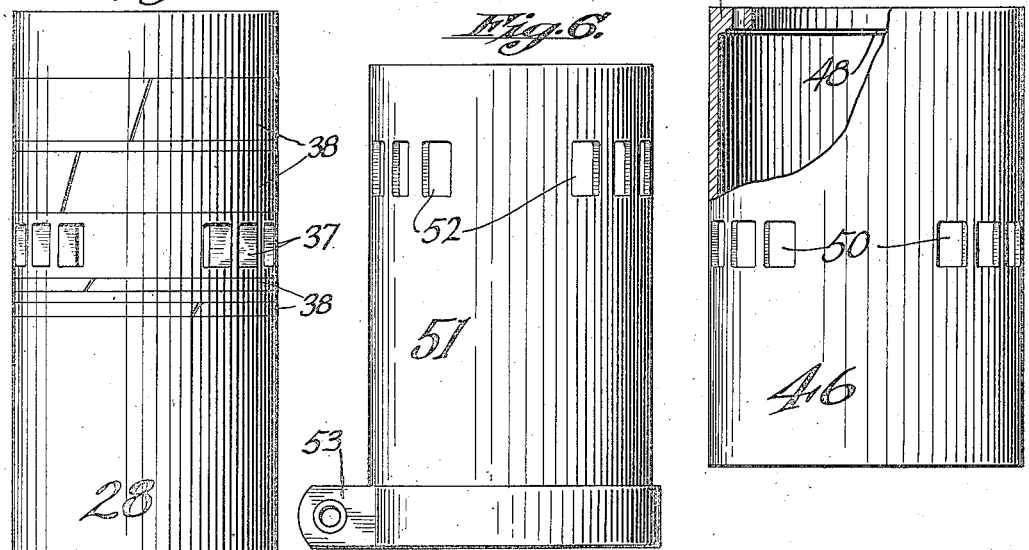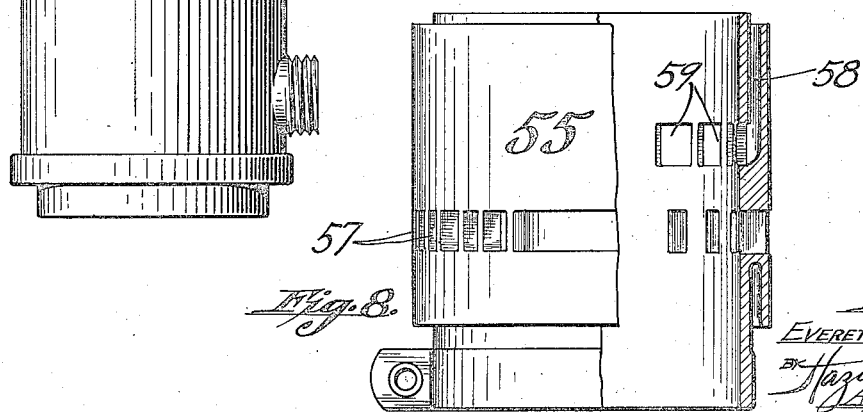

Patented Oct. 7, 1924.

1,510,650

UNITED STATES PATENT OFFICE.

EVERETT R. BURTNETT, OF LOS ANGELES, CALIFORNIA, ASSIGNOR, BY DIRECT AND MESNE ASSIGNMENTS, OF ONE-THIRD TO HARRY R. PHILLIPS, OF NEWHALL, CALIFORNIA, AND ONE-THIRD TO HOMER A. BRUNELL, OF LOS ANGELES, CALIFORNIA.

INTERNAL-COMBUSTION ENGINE.

Application filed February 14, 1921. Serial No. 444,662.

*To all whom it may concern:*

Be it known that I, EVERETT R. BURTNETT, a citizen of the United States, residing at Los Angeles, in the county of Los Angeles and State of California, have invented new and useful Improvements in Internal-Combustion Engines, of which the following is a specification.

My invention relates generally to internal combustion engines, and more particularly to an engine of the sleeve valve type, the principal object of my invention being to generally improve upon and simplify the construction of the existing types of internal combustion sleeve valve engines.

Further objects of my invention are to provide a relatively simple and efficient construction wherein the piston operates within a water jacketed cylinder and the sleeve valves being disposed about said cylinder, which arrangement separates the valve mechanism from the combustion chamber and piston, thereby minimizing the convection of heat to the sleeve valves and consequently minimizing their tendency to expand during operation, to provide improved means for disseminating the heat generated during the continuous operation of the engine, to provide simple and efficient means for admitting gaseous fuel into the combustion chamber from practically all points throughout its circumference and likewise permitting the exhaust of burnt gases from the combustion chamber outwardly at practically all points throughout its circumference, to provide a construction wherein a relatively fixed cylinder or sleeve is arranged between the two sliding sleeves or valves, all of which sleeves are provided with ports that are adapted to coincide with each other as the sliding sleeves are reciprocated, thereby making it possible to provide correct timing for four-cycle operation of the engine, and further, to provide a sleeve valve internal combustion engine that can be readily assembled or taken apart and which can be used with equal advantage as a high power motor of the high speeds or for heavy duty at relatively low speeds and in addition, said engine having the advantages of being comparatively silent in operation and positive and uniform in valve action.

With the foregoing and other objects in view, my invention consists in certain novel features of construction and arrangement of parts that will be hereinafter more fully described and claimed and illustrated in the accompanying drawings, in which Fig. 1 is a side elevational view of an internal combustion engine constructed in accordance with my invention.

Fig. 2 is a vertical section taken through the central axial line of one of the cylinders of my improved invention.

Fig. 3 is a horizontal section taken on the line 3—3 of Fig. 2.

Fig. 4 is a horizontal section taken on the line 4—4 of Fig. 2.

Fig. 5 is an elevational view of the water jacketed cylinder within which the piston is arranged and upon which the sleeve valves are positioned for operation.

Fig. 6 is an elevational view of the inner sleeve valve of the engine.

Fig. 7 is a side elevational view, partly in section, of the stationary sleeve that is arranged between the inner and outer reciprocating sleeve valves.

Fig. 8 is a side elevational view, partly in section, of the outer sleeve valve and which controls the inlet of combustible fuel to the combustion chamber of the engine and the exhaust of burnt gases therefrom.

Referring by numerals to the accompanying drawings, which illustrate a practical embodiment of my invention, 10 designates the crank case, same being preferably formed of cast metal and constructed in two or more parts to facilitate manufacture and assembly, and arranged for rotation in suitable bearings within said crank case is a crank shaft 11 and a valve operating crank shaft 12, the latter being driven directly from crank shaft 11 by a train of gearing such as 13 and which latter is inclosed in a suitable housing 14.

Inasmuch as there are two sleeve valves for each cylinder of the engine, it is necessary to form the shaft 12 with two cranks 15 and 16 for each cylinder and these cranks are disposed substantially 90° apart; (see Fig. 2).

Projecting upwardly from the top of crank case 10 is a shell or housing 17 that incloses the cylinders and sleeve valves of the engine, and the upper portion of this shell or housing is provided with a finished annular face 18 that serves as a bearing surface for the outer face of the outer sleeve valve and which will be hereinafter more fully described.

Formed in the wall of the shell 17 around that portion having the finished inner face 18 is an annular gaseous fuel distributing chamber 19 having an inlet opening 20 to which is connected a gaseous fuel supply pipe (not shown), and formed through the inner wall of this chamber is a series of radially disposed gaseous fuel inlet ports 21.

Inclosing the upper end of shell or housing 17 is a flange 22 that is formed on the lower end of a hollow exhaust cap 23 and which latter is provided with an outlet 24 to which may be connected a suitable exhaust pipe, (not shown).

Cap 23 is provided with integrally formed vertically disposed cylindrical wall 25 and formed therein is an annular chamber 26 through which a fluid cooling medium such as water is adapted to circulate and for this purpose one end of a circulating pipe such as 27 is connected to said chamber 26.

Depending from the lower end of the cylindrical wall 25 in cap 23 is a cylinder 28 the lower end of which rests directly on top of the crank case 10, and the wall of this cylinder is provided with an annular chamber 29 through which is adapted to circulate a fluid cooling medium such as water and this annular chamber has communicating with the fluid cooling medium chamber 26 in cap 23 by means of coinciding ports such as 30. The fluid cooling medium is delivered to the lower portion of chamber 29 by means of a pipe 31, the same being provided adjacent to its end with a flange 32 that bears directly against the outer end of a threaded nipple 33 and which latter projects outwardly from the lower portion of the cylinder 28.

Mounted on this threaded nipple is a flanged collar 34 that incloses the flange 32 on pipe 31, and seated in the wall of housing 17 around pipe 31 is a screw plug 35 and which latter closes an opening in said housing through which access may be had to the connection between pipe 31 and nipple 33.

Interposed between screw plug 35 and the outer end of flanged collar 34 is a suitable packing ring 36.

Formed through the wall of the cylinder 28 a short distance below its upper end is a series of radially disposed ports 37, and seated in the outer face of said cylinder above and below these ports are suitable packing rings such as 38. A plate or disc 39 is positioned within the cylinder immediately above the plane occupied by the ports 37 and formed integral with this plate or disc is an upwardly projecting annular wall 40 that coincides with the corresponding wall 25 that is formed in cap 23.

Extending downwardly through the openings in the coinciding annular walls 25 and 40 is a tubular member 41 the lower end of which is externally threaded in order to engage a corresponding internal thread that is formed in the lower portion of the annular wall 40, and by virtue of this construction the cylinder 28 and cap 23 are firmly secured to each other and maintained in proper assembled relation.

Seated in the center of plate 39 is a spark plug 42 the terminals of which are centrally arranged within the space surrounded by the radially disposed ports 37. The bore or space within the lower portion of cylinder 28 and below plate 39 serves as the combustion chamber 43 of the engine, and the inner face of said chamber is machined in order to receive a piston such as 44 and which latter is connected to crank shaft 11 by an ordinary form of connecting rod 45.

A relatively stationary cylinder that incloses the upper portion of cylinder 28 comprises a tubular member 46 having an internal diameter that is slightly greater than the external diameter of said cylinder 28, and formed integral with the upper end of this stationary cylinder is an inwardly projecting flange 47 that is provided on its underside with a shoulder 48 and which latter bears directly against the upper outer edge of cylinder 28, thereby centering the cylinder 46 upon said cylinder 28, and passing through said flange 47 and seated in the top of cylinder 28 are fastening devices 49 such as bolts or screws.

Formed through the wall of the stationary cylinder 46 is a plurality of ports 50 that occupy the same horizontal plane with the ports 37. Both faces of the wall of cylinder 46 are machined to form a working fit with corresponding surfaces on the sleeve valves utilized in my improved engine, and the external surface of cylinder 28 is likewise machined to provide a working fit for the sleeve that is positioned between the relatively stationary cylinders 28 and 46. This inner sleeve valve, which is illustrated in Fig. 6, comprises a hollow cylindrical member 51 open at both ends and being arranged for sliding movement between the cylinders 28 and 46.

Formed through the upper portion of the wall of this inner sleeve valve is a series of ports such as 52 that are adapted to coincide with the ports 37 and 50 when said inner sleeve valve is drawn downward to its limit of movement.

Pivotally connected to a lug 53 that projects outwardly from the lower end of cylinder 51 is the upper end of a connecting rod 54, the lower end thereof being connected to crank 15 on shaft 12.

The outer sleeve valve, which is illustrated in Fig. 8, comprises a substantially cylindrical member 55, open at both ends, and the wall thereof being substantially greater in thickness than the thickness of the inner sleeve valve 51. This outer sleeve valve is arranged for sliding movement in the chamber between stationary sleeve 46 and the upper portion of housing 17, and both surfaces of the wall of said sleeve valve are machined to provide working fit with the adjacent surfaces of the relatively fixed parts.

The lower end of this outer sleeve valve is connected by a connecting rod 56 to crank 16 on shaft 12. Formed through the lower portion of the wall of the outer sleeve valve is a series of ports 57 that are adapted to coincide with ports 50 in member 46 and ports 21 in the inner wall of the exhaust chamber 19 when the outer sleeve valve reaches its upward limit of movement.

Formed in the upper portion of the wall of the outer sleeve valve 55 is an annular chamber 58 open at its upper end and its lower end communicating with a series of ports 59 that are formed through the inner wall of chamber 58 and which last mentioned ports are adapted to coincide with ports 37, 50 and 21 when the outer sleeve valve reaches its downward limit of movement.

The open upper end of annular chamber 58 communicates directly with the chamber in the upper portion of housing 17, and formed through the top of said housing and communicating with the chamber in cap 23 is a series of exhaust outlet ports or openings 60.

The operation of my improved internal combustion engine is as follows: Assuming that a charge of combustible vapor has been drawn into the combustion chamber 43 above the piston 44 and that the latter and the various parts of the engine have moved into the position illustrated in Fig. 2, and further, that the timing apparatus associated with the engine acts to produce a spark between the terminals of plug 42, the compressed combustible charge above the piston would be ignited and force said piston downwardly on its power stroke. During this downward movement of the piston, crank shaft 11 and sleeve valve operating shaft 12 would be rotated in the same direction as illustrated by arrows in Fig. 2.

During the first half of this downward or power stroke of the piston, crank 16, which is 90° in advance of crank 15, will move downward thereby through connecting rod 56, drawing the outer sleeve valve 55 downward so that exhaust port 59 communicates with ports 50 in stationary sleeve or cylinder 46, and simultaneously crank 15, through connecting rod 54, draws inner cylinder 51 downward until the ports 52 in said inner cylinder or sleeve register with ports 50 and 59, and on the following upward or exhaust stroke of the piston, the burnt gases and products of combustion will be forced out of the combustion chamber through ports 50, 52 and 59 and from thence through annular chamber 58 into the chamber in the upper portion of housing 17, and from thence, through openings 60, into and through the hollow cap 23 and out through the exhaust pipe connected to outlet 24.

Upon the succeeding downward or suction stroke of the piston, the inner and outer sleeve valves will have been moved through their connecting rods 54 and 56 and cranks 15 and 16 into position so that ports 57, 52, 50 and 37 communicate with each other, and consequently a charge of combustible vapor will be drawn through inlet opening 20 into and through the annular distributing chamber 19, and from thence through the coinciding ports into the combustion chamber.

At the termination of the suction stroke, the sleeve valves will have been moved by connections 54 and 56 and cranks 15 and 16 into position so that ports are out of register with ports 21 and 37 and on the succeeding upward or compression stroke of the piston, the explosive charge drawn into the combustion chamber will be compressed until the piston reaches its upper limit of travel, whereupon the timing apparatus will act to produce a spark between the terminals of the spark plugs, thereby igniting the charge and driving the piston downward on its succeeding power stroke.

Among the particularly novel and advantageous features of construction employed in my improved engine, I desire to call especial attention to the construction and arrangement of the relatively stationary but readily removable cylinder 28, the same being provided through the greater portion of its length with a water jacket and said cylinder being machined inside and out in order to receive the piston within the bore and sliding sleeve valve on its outer surface.

By such arrangement the valve mechanism is separated from the combustion chamber and piston by a water cooled cylinder wall, with the result that the sleeve valves are disposed so that expansion thereof will be minimized as a result of limited and uniform temperature conditions. This arrangement also enables the piston to be evenly and effectually cooled, for it will be noted that said piston is in direct contact with the water cooled cylinder wall and by virtue of such construction, said piston and the valves are particularly effective for heavy duty.

The improved constructions just noted provide an engine that is much more efficient than the types of sleeve valve engines now in general use and which latter are generally constructed so that the sleeves are located within the water cooled cylinder and form a slidable cylinder for the piston, and which latter arrangement adds materially to the difficulties of lubrication and heat convection from the piston and the proper and efficient cooling of the valves.

Another important feature of my improved construction is the arrangement of the removable sleeve wall or cylinder 46 that is maintained in an efficient position and sustained between the two slidable sleeve valves to form a fixed cylinder for the inner one of said sleeve valves. This fixed cylinder makes it possible to correct the timing for four-cycle operations with the use of two moving valve members, one of the latter being provided with an annular row of ports and adapted to register with the annular row of ports in the combustion chamber and such registration being maintained for the duration of approximately two strokes of the piston which permit the escape of the spent gases during the exhaust stroke and the admittance of the combustible charge during the suction stroke.

These functions are made possible by the arrangement of the two sleeve valves on opposite sides of a fixed cylinder wall and the arrangement of the ports in said sleeve valves, said fixed wall and the ports in the inner cylinder.

Further, the admission of the combustible charges of gas through practically the entire circumference of the sleeves and the cylinder and through the ports that the spent or burnt gases escape counteracts the heating effect of the highly heated exhaust gases, thereby minimizing the variation of temperature and the consequent expansion of the co-operating parts.

Further, the location of the sleeve valves outside of and encompassing the water cooled cylinder permits the increased diameter of the outer structure of the engine and consequently adding substantially to the area of the ports and at the same time minimizing the degree of reciprocating movement that is necessary to the proper operation of the sleeves.

By providing a maximum of port area, the spent or burnt gases are freely and quickly exhausted and likewise the combustible charge is taken to the combustion chamber more quickly and said charge will be ignited at a central point and burn more uniformly by reason of the fact that the spark plug is located centrally within the combustion chamber and centrally with respect to the radially arranged gas inlet ports.

My improved construction provides a port area ratio relative to the piston displacement which dual popet valves or existing valves of the sleeve type cannot equal in efficiency.

A further improvement of construction resides in the particular formation and arrangement of the outer sleeve valve which in operation registers or coincides with the ports in the fixed sleeve wall, the inner sleeve valve, the cylinder, the exhaust passage and the inlet fuel passage; thus the outer sleeve member may be properly termed a manifold selector and in construction it differs from the port arrangement in the other members, for it has two series of ports, each series being arranged throughout the entire circumference of its inner periphery in the same plane and the two planes of ports having between them a closed or imperforate periphery that is equal in height to that of the ports in the fixed sleeve wall.

The upper series of ports in this outer sleeve valve is formed at the base of an annular space that occupies the upper portion of the valve member and opening through its upper end. This port and annular space arrangement provides the exhaust chamber for the outer sleeve valve.

The lower series of ports in this outer sleeve valve forms straight passages radially through the sleeve valve opening into the inner and outer peripheries in the said plane, and these ports provide the necessary fuel gas chamber of said outer sleeve. The port area in my improved construction being so great in ratio to the bore and stroke, the lead and lag timing of the valve opening and closing can be maintained at any desired degree, or reduced or increased, and consequently an engine is provided that will develop a relatively high power line at high speeds, and at the same time capable of heavy duty at slow speeds.

It will be readily understood that minor changes in the size, form and construction of the various parts of my improved internal combustion engine may be made and subsituted for those herein shown and described without departing from the spirit of my invention, the scope of which is set forth in the appended claims.

I claim as my invention:

1. In an internal combustion engine, a housing, a cap positioned on said housing and provided with an exhaust chamber and with a fluid cooling medium chamber, a water jacketed cylinder within said housing, the chamber of the water jacket in said cylinder communicating with the fluid cooling medium chamber in the cap, ported cylindrical members concentrically arranged about the water jacketed cylinder within the housing, one of which cylindrical members is provided with an exhaust chamber which communicates with the exhaust chamber in the cap and means for actuating certain of said ported cylindrical members for controlling the admission of combustible fuel to the combustion chamber in the water jacketed cylinder and for controlling the exhaust of burnt gases from said combustion chamber.

2. In an internal combustion engine, a housing having a gas distributing chamber, a power cylinder removably arranged within the housing, exhaust and intake ports formed in the cylinder and adapted to communicate with said distributing chamber, an exhaust cap sustained on the housing, exhaust ports formed in the housing to effect communication with said cap, a stationary sleeve fixed on the cylinder and disposed concentrically of the latter, concentric sleeves mounted for sliding movement at opposite sides of and against the stationary sleeve, and ports formed in all of said sleeves for controlling the supply of gaseous fuel to the cylinder ports and for effecting the discharge of products of combustion from the cylinder through said exhaust ports.

In testimony whereof I have signed my name to this specification.

EVERETT R. BURTNETT.